(No Model.) 2 Sheets—Sheet 1.
H. H. BOTHE.
FIFTH WHEEL.
No. 488,110. Patented Dec. 13, 1892.
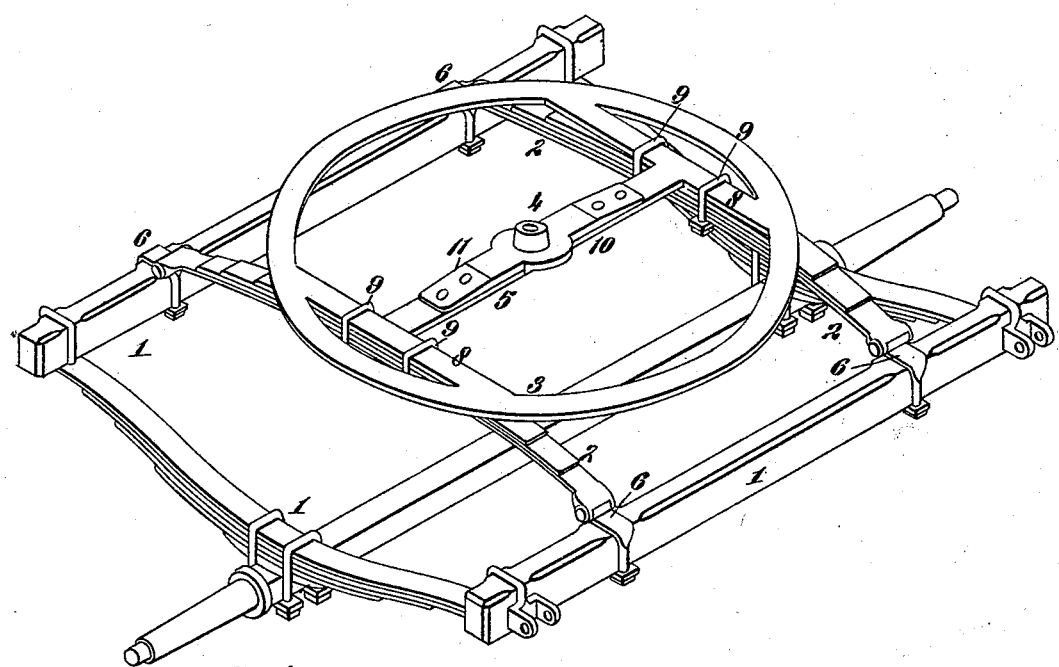
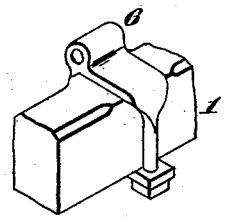
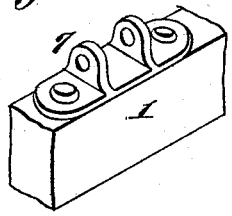
Attest:
Geo. E. Cruse
Wm. E. Knight
Inventor:
Herman H. Bothe
By Knight Bros
Attys (No Model.) 2 Sheets—Sheet 2.
H. H. BOTHE.
FIFTH WHEEL.
No. 488,110. Patented Dec. 13, 1892.
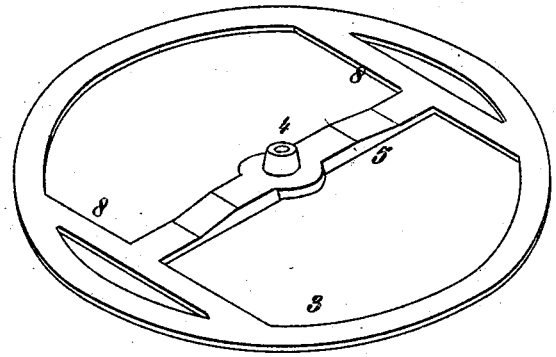
Fig. IV.
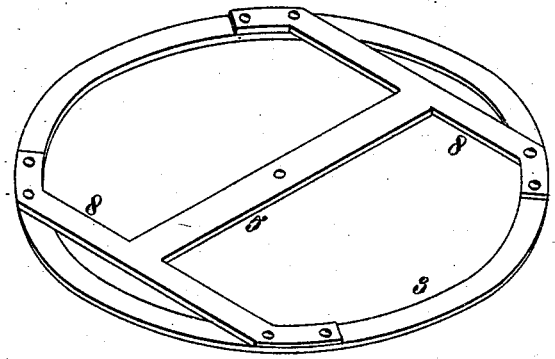
Fig. V.
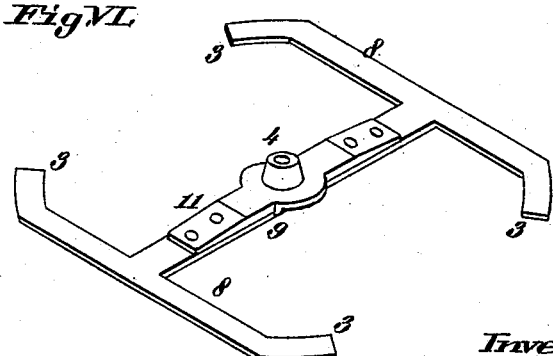
Fig. VI.
Attest:
Geo. E. Cruse
Wm. E. Knight
Inventor:
Herman H. Bothe
By Wright Bros
Attys
THE NORRIS PETERS CO., PHOTO-LITHO., WASHINGTON, D. C.

UNITED STATES PATENT OFFICE.

HERMAN H. BOTHE, OF ST. LOUIS, MISSOURI.

FIFTH-WHEEL.

SPECIFICATION forming part of Letters Patent No. 488,110, dated December 13, 1892.

Application filed January 8, 1892. Serial No. 417,368. (No model.)

*To all whom it may concern:*

Be it known that I, HERMAN H. BOTHE, of the city of St. Louis, in the State of Missouri, have invented a certain new and useful Improvement in Fifth-Wheels, of which the following is a full, clear, and exact description, reference being had to the accompanying drawings, forming part of this specification.

My invention relates to certain improvements in fifth-wheel arrangements for vehicles; and my invention consists in features of novelty hereinafter fully described, and pointed out in the claims.

Figure I is a perspective view illustrative of my invention. Figs. II and III are detail perspective views showing different forms of clips. Figs. IV, V, and VI, are perspective views illustrating modifications of my preferred form of fifth-wheel.

Referring to the drawings, 1 represents part of the running-gear of a vehicle, to the springs 2 of which the lower member 3 of my improved fifth-wheel is attached, the upper member of the fifth-wheel, which would be attached to the body of the vehicle, not being shown, but it is a counterpart of the lower member, except it would have a perforation in the cross-bar to fit over the boss 4 on the cross-bar 5 of the lower member.

6 represents one form of clip (see Figs. I and II) for securing the springs 2 to the cross-pieces of the running-gear, and 7 represents (see Fig. III) another form of clip for this purpose.

The member 3 of the fifth-wheel is in my preferred form made in a circle with parallel straight side pieces 8, fastened by clips 9 to the springs 2. The side pieces are connected by a cross-bar 5, having the boss 4. The cross-bar may be strengthened by a strap 11, riveted thereto, as shown in Figs. I and VI, or formed in one part therewith, as shown in Fig. IV.

In Fig. V, I have shown the side pieces formed with curved extensions or ends and riveted to the circle, instead of being formed in one part therewith, as in Figs. I and IV, and I have shown the cross-bar formed integral therewith and without a strenthening-strap 11 and boss 4.

In Fig. VI, I have shown the side pieces 8, having but short portions of the circle upon them.

It will be seen that with my improved fifth-wheel the front wheels of the running-gear will be permitted to turn more than a half-circle relatively to the body, and can, if necessary, make a complete revolution.

I claim as my invention—

1. An improved fifth-wheel having parallel straight side pieces and a cross-bar extending between and connecting the side pieces, and formed with a reinforced or thickened central portion, as set forth.

2. A fifth-wheel having side pieces 8, a cross-piece 5, connecting the side pieces, and a strengthening-piece 11, having a boss 4, substantially as set forth.

3. A fifth-wheel comprising a circular member 3, side pieces 8, having curved extensions or ends, and the cross-bar 5, extending between said side pieces, said cross-bar and side pieces being formed in an integral piece and secured to the member 3 by rivets passing through the curved ends of the side pieces, substantially as set forth.

4. The combination of the forward part of the running-gear, the lower circular member of the fifth-wheel secured to said running-gear, the body and the upper circular member of the fifth-wheel secured to the body, both of said circular members being formed with side pieces 8 and a connecting cross-bar 5, and said cross-bars being formed, respectively, with a boss and corresponding opening for fitting together, substantially as set forth.

HERMAN H. BOTHE.

In presence of—
E. S. KNIGHT,
A. M. EBERSOLE.